US011778039B1

(12) United States Patent
Delaney et al.

(10) Patent No.: US 11,778,039 B1
(45) Date of Patent: Oct. 3, 2023

(54) SYSTEMS AND METHODS FOR ESTABLISHING DISCRETE CONNECTION TO A NETWORK ENDPOINT

(71) Applicant: Cyber IP Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US)

(73) Assignee: Cyber IP Holdings, LLC, Herndon, VA (US)

( * ) Notice: Subject to any disclaimer, the term of this patent is extended or adjusted under 35 U.S.C. 154(b) by 0 days.

(21) Appl. No.: 17/744,819

(22) Filed: May 16, 2022

Related U.S. Application Data (60) Provisional application No. 63/190,262, filed on May 19, 2021.

(51) Int. Cl.
*H04L 67/141* (2022.01)
*H04L 67/147* (2022.01)
*H04L 67/2895* (2022.01)
*H04L 67/02* (2022.01)
*H04L 67/561* (2022.01)

(52) U.S. Cl.
CPC ............ *H04L 67/141* (2013.01); *H04L 67/02* (2013.01); *H04L 67/147* (2013.01); *H04L 67/2895* (2013.01); *H04L 67/561* (2022.05)

(58) Field of Classification Search
CPC ..... H04L 67/141; H04L 67/02; H04L 67/147; H04L 67/2895; H04L 67/561
See application file for complete search history.

(56) References Cited

U.S. PATENT DOCUMENTS

| 10,601,948 | B1 * | 3/2020 | Juravicius | ........... H04L 43/0823 |
| 2010/0250648 | A1 * | 9/2010 | Cao | ..................... H04L 67/1001 |
| | | | | 709/219 |
| 2022/0279046 | A1 * | 9/2022 | Perng | .................... H04L 67/133 |

* cited by examiner

*Primary Examiner* — Cheikh T Ndiaye
(74) *Attorney, Agent, or Firm* — Jones Day (57) ABSTRACT

Systems and methods are provided for connecting a client to a desired network endpoint. Example systems and methods include receiving, at a server, a request identifying a network endpoint to be accessed, configuring a proxy instance, the proxy instance being configured to receive a connection from a client to forward that client connection to the identified network endpoint, and deleting the proxy instance upon occurrence of a session end criteria. In some embodiments, the request identifying a network endpoint to the server is received from the network endpoint. In some embodiments, the request identifying a network endpoint to the server is received from the client. In some embodiments, a platform as a service is used to configure the proxy instance. In some embodiments, the request identifying a network endpoint is made to the platform as a service rather than to the server, which is not included in the embodiment.

20 Claims, 7 Drawing Sheets

SYSTEMS AND METHODS FOR ESTABLISHING DISCRETE CONNECTION TO A NETWORK ENDPOINT

CROSS REFERENCE TO RELATED APPLICATIONS

This application claims priority to U.S. Provisional Application No. 63/190,262, filed May 19, 2022, and makes reference to U.S. Pat. Nos. 10,080,249, 10,616,938, 9,935,850, 10,476,761, and 10,897,409, by Delaney, et. al., all of which are incorporated herein by reference in their entireties.

BACKGROUND

Networks facilitate communication between entities. Confidentiality, security, and privacy interests may make it desirable to obfuscate characteristics of those communications. For example, content of communications across a public network may be protected via encryption of those communications. It may also be desirable to shield characteristics of the communicating entities, including aspects such as the identity of the communicating entities and their locations (e.g., physical or network locations).

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Some embodiments of the disclosure are described. Additional operations can be provided before, during, and/or after the stages described in these embodiments. Some of the stages that are described can be replaced or eliminated for different embodiments. Additional features can be added to the circuit. Some of the features described below can be replaced or eliminated for different embodiments. Although some embodiments are discussed with operations performed in a particular order, these operations may be performed in another logical order.

Systems and methods as described herein provide, in examples, mechanisms that enable network connections to be established among parties (e.g., two parties comprising a client and a network endpoint) while protecting confidentiality of aspects of those communications and parties, such as without one or both of the parties being aware of the actual network location of the other party. For two parties to establish a connection and communicate with one another over a network, both parties on each end of the connection typically have a network path to the other endpoint. This arrangement may present a privacy vulnerability because the connection could reveal the network location of each party to the other or to third parties observing the communication channel. When a client application connects to a network endpoint on a server over the internet, the client's network location on the internet may be visible to the network endpoint. From the network endpoint's perspective, if the network endpoint wants clients to be able to connect to it on its server over the internet, the clients may know the network endpoint's network location on the internet to establish the connection. In both of these circumstances, there should be trust between the parties that the network location information will not be used for malicious purposes. Such trustworthiness is not an assured thing, especially as interest in internet security and privacy grows with increasing data breaches and data collection.

Systems and methods as described herein, sometimes referred to as Displacer systems and methods, enable a network connection to be established between two parties, such as a client and an endpoint, without disclosing one or both parties' network location to the other party. In some embodiments, a system establishes a network connection between a client or user and a network endpoint on a server without the network endpoint being aware of a location of the client or user. In other embodiments, a network connection may be established between a client or user and a network endpoint on a server without the client or user knowing the actual network location of the network endpoint or its server. Additionally, any interactions between the client and network endpoint are shielded from third-party observers.

In some embodiments, the proxy instance is utilized to facilitate the system and methods as described herein. In embodiments, such proxy instances may be implemented as a Portal Proxy instance, as described in U.S. Pat. Nos. 10,080,249 and 10,616,938, which are incorporated herein by reference in their entirety. In embodiments wherein the proxy instance is a Portal Proxy instance, a first reverse proxy connection is configured to receive a connection from the client to set up a discreet connection, where an invitation indicating a mechanism for accessing the first reverse proxy connection is provided to the client. Access credentials are transmitted to the client over the first reverse proxy connection, the access credentials including an address for accessing a second reverse proxy connection, the first reverse proxy connection being deleted following delivery of the access credentials. The second reverse proxy connection facilitates the discreet connection between the client and the network endpoint without any detectable direct contact with the service.

In some embodiments, public IP addresses of Inbound Proxy nodes of a network (e.g. a Fognigma Network) are used instead of a real IP address of the network endpoint as a designated endpoint of the proxy instances, as described in U.S. Pat. Nos. 9,935,850, 10,476,761, and 10,897,409, which are incorporated herein by reference in their entirety. In such embodiments, a network specification is received from the network endpoint. Resources from one or more resource providers are provisioned. An on-demand computing network is configured according to the network specification, wherein a first provisioned resource is configured as a hub device and one or more second provisioned resources are provisioned as rim devices, where rim devices are configured to communicate with one another only via the hub device. The network endpoint is then implemented as a rim device, which can be contacted by the client only through the hub device. In this embodiment, the client can only see the IP address of the hub device and not the IP address of the network endpoint itself.

Figure 1:
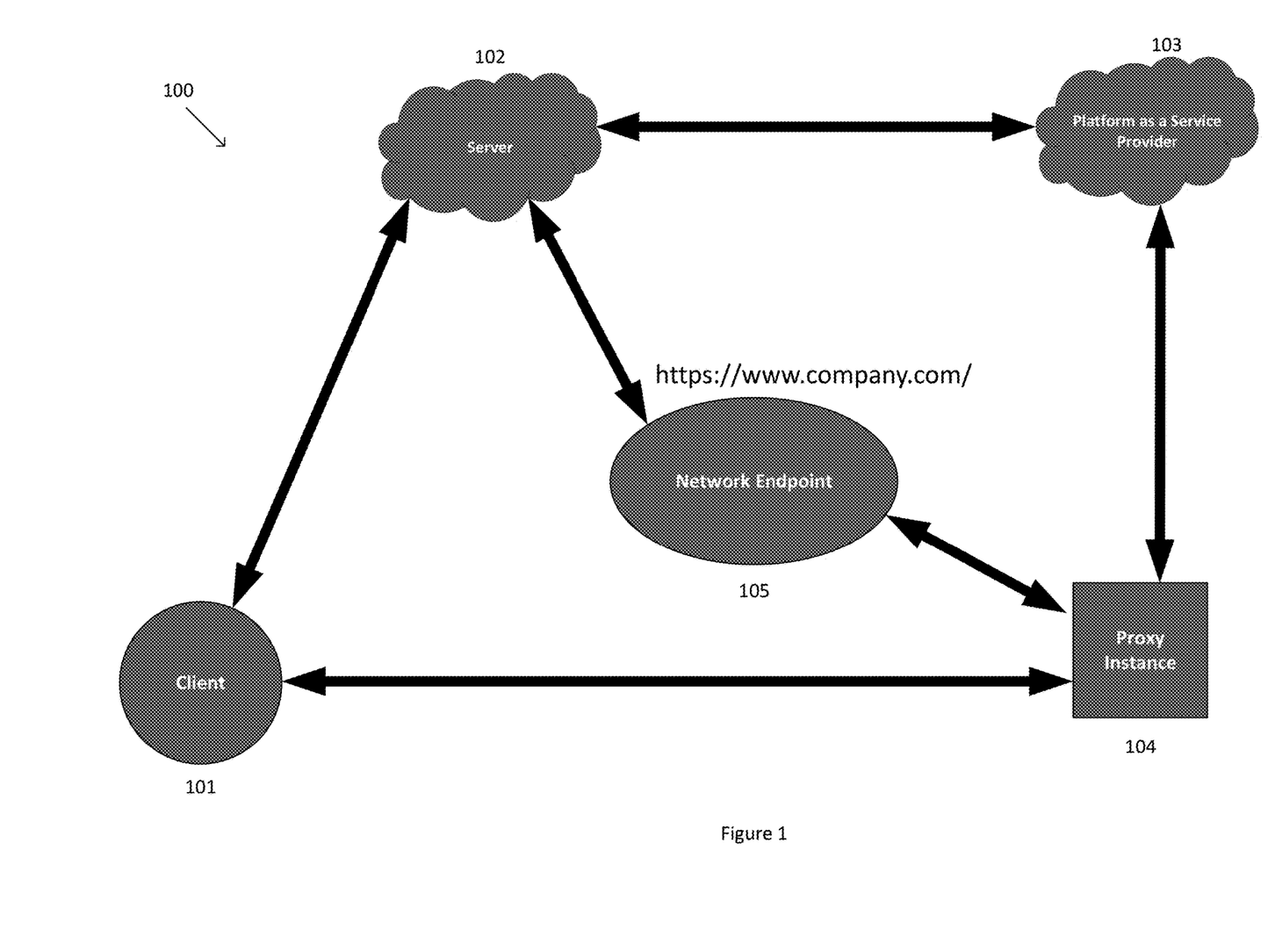
FIG. 1 is a block diagram depicting an example topology configuration of a computer-implemented environment to establish a network connection between a client and a network endpoint without revealing the client's network location to the network endpoint.

FIG. 1 is a block diagram depicting an example topology configuration of a computer-implemented environment 100 to establish a network connection between a client 101 and a network endpoint 105 without revealing the client's network location to the network endpoint 105. In some embodiments, the client 101 may be a network application or an internet user. The client 101 interacts with a server 102. In some embodiments, the client 101 connects to the server 102 by navigating to a known URL address of the server 102. The server 102 interacts with a platform as a service provider 103. In some embodiments, the server requests the platform as a service provider to create a proxy instance 104 (e.g., a proxy instance that is only configured for connections between the client 101 and the network endpoint 105 or a limited set of network endpoints). In some embodiments, the platform as a service provider 103 is configured with Portal Proxy software and configures the proxy instance 104 as a Portal Proxy instance.

The connection between the client 101 and the network endpoint 105 is facilitated by the proxy instance 104. In some configurations, the platform as a service provider 103 sends a URL of the proxy instance 104 to the server 102, which then sends the URL of the proxy instance 104 to the client 101. The client 101 then accesses the proxy instance, such as by using the URL of the proxy instance 104 to establish a connection to the proxy instance 104. This connection between the client 101 and the proxy instance 104 may take a variety of forms, including a virtual private network (VPN) connection. In some implementations, the proxy instance 104 may be configured with an IP address whitelist that is populated with an address associated with the client 101, thereby limiting connections to the proxy instance 104 to connections from the client 101.

In embodiments, this process prevents the network endpoint 105 from determining an actual network location of the client 101. Instead, the network endpoint 105 is limited to determining a network location of the proxy instance 104 by observing the connection made to the network endpoint 105 by the client 101 through the proxy instance 104.

In some examples, the proxy instance 104 is a temporary entity to facilitate communication between the client 101 and the network endpoint 105 for a limited period of time. For example, the proxy instance 104 may be deleted upon the occurrence of a session end criteria. In some embodiments, the session end criteria occurs when the client 101 terminates a connection to the network endpoint 105 or to the proxy instance, whereupon detection of that connection termination, the proxy instance initiates termination of its instance (e.g., via a message to the platform as a service provider 103). In another example, the session end criteria takes the form of an expiration of a pre-determined period of time or inactivity for more than a threshold period of time, such session end criteria may be detected by the proxy instance 104, by the server 102, or by the platform as a service provider 103 that spawned the proxy instance 104. In some embodiments, when the client 101 is done with the connection to the network endpoint 105, the client 101 directs the server 102 to delete the proxy instance 104 via a communication to the server 102. The server 102 directs the platform as a service provider 103 to delete the proxy instance 104, and the platform as a service provider 103 deletes the proxy instance 104.

In embodiments, the implementation of FIG. 1 can be accomplished without the client 101 needing to have accounts or credentials with any platform as a service provider 103. Because the server 102 acts as an agent to the platform as a service provider 103, more than one platform as a service provider may be used for different connections without requiring additional configuration on the client 101.

Figure 2:
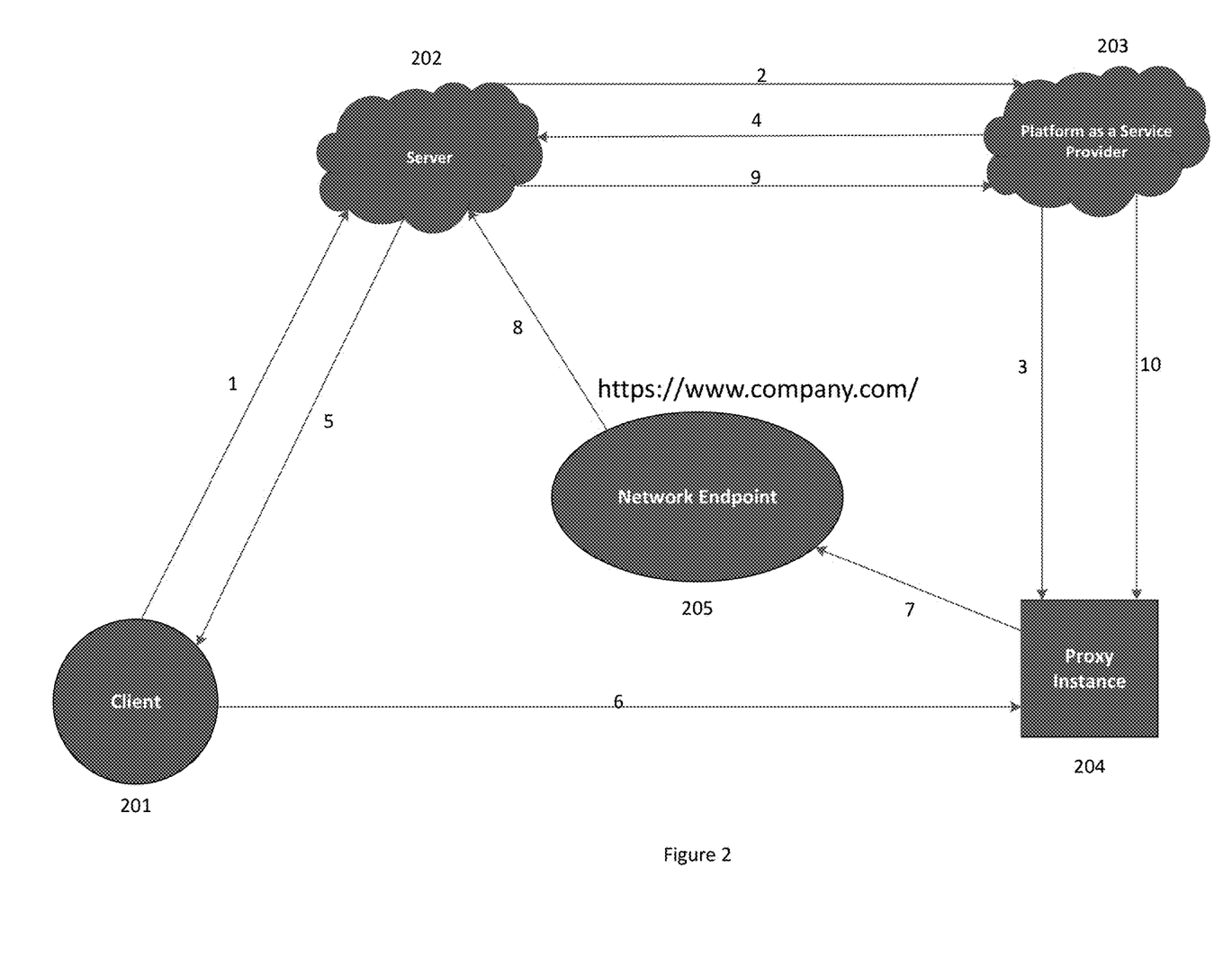
FIG. 2 is a block diagram depicting an example set of operations to establish a network connection between a client and a network endpoint without revealing the client's network location to the network endpoint.

FIG. 2 is a block diagram depicting an example set of operations to establish a network connection between a client 201 and a network endpoint 205 without revealing the client's network location to the network endpoint 205. In some embodiments, the client 201 may be a network application or a network user. In some embodiments, in communication 1 of FIG. 2, the client 201 initiates a connection with a server 202 by connecting to a known URL address of the server 202. Upon connecting to the server 202, the client 201 requests a proxy connection to the network endpoint 205 by communicating the known URL address of the network endpoint 205 to the server 202.

Upon receiving the URL of the network endpoint 205 from the client 201, in communication 2 of FIG. 2, the server 202 makes a request to a platform as a service provider 203 to configure and launch a proxy instance 204. The proxy instance 204 is configured to redirect connections made to the proxy instance 204 to the network endpoint 205 in communication 3 of FIG. 2. In some embodiments, the proxy instance 204 is an instance of the Portal Proxy software. In some embodiments, in communication 4 of FIG. 2, the platform as a service provider 203 communicates a URL of the proxy instance 204 to the server 202 upon launching the proxy instance 204. In communication 5 of FIG. 2, the server 202 communicates the URL of the proxy instance 204 to the client 201.

Upon receiving the URL of the proxy instance 204 from the server 202, the client 201 uses the URL to make a connection to the proxy instance 204 in communication 6 of FIG. 2. The connection of the client 201 to the proxy instance 204 is then forwarded by the proxy instance 204 to the network endpoint 205 in communication 7 of FIG. 2.

In some embodiments, the network endpoint 205 is unable to determine an actual network location of the client 201. Instead, the network endpoint 205 can only determine a network location of the proxy instance 204 by observing the connection made to the network endpoint 205 by the client 201 through the proxy instance 204.

The proxy instance 204 is deleted upon the occurrence of a session end criteria. In some embodiments, the session end criteria occurs when the client 201 terminates a connection to the network endpoint 205, an expiration of a pre-determined period of time, or inactivity for more than a threshold period of time. In some embodiments, in communication 8 of FIG. 2, when the client 201 is done with the connection to the network endpoint 205, the client 201 directs the server 202 to delete the proxy instance 204. In communication 9 of FIG. 2, the server 202 directs the platform as a service provider 203 to delete the proxy instance 204. In communication 10 of FIG. 2 the platform as a service provider 203 deletes the proxy instance 204.

Figure 3:
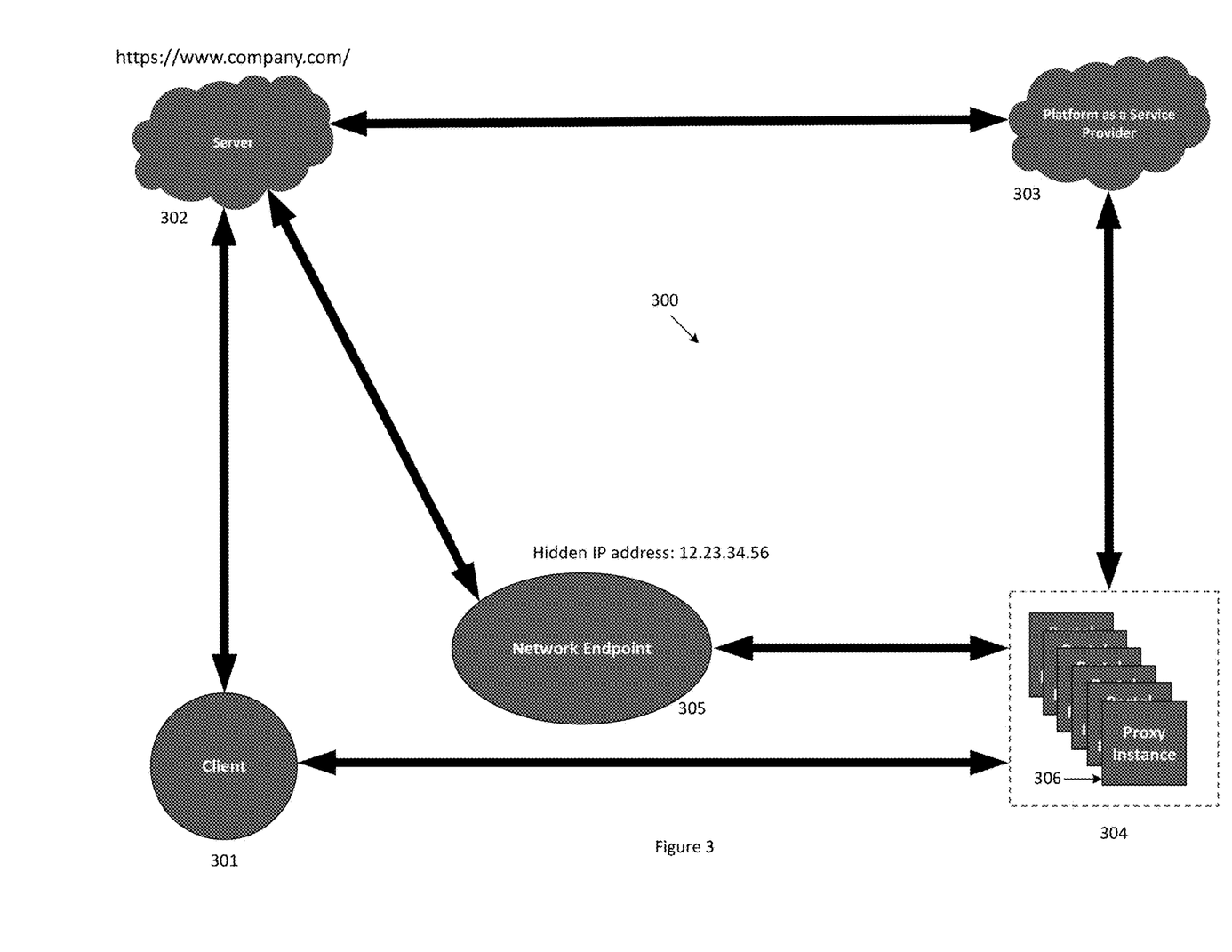
FIG. 3 is a block diagram depicting an example topology configuration of a computer-implemented environment to establish a network connection between a client and a network endpoint without revealing the network endpoint's network location to the client.

FIG. 3 is a block diagram depicting an example topology configuration of a computer-implemented environment 300 to establish a network connection between a client 301 and a network endpoint 305 without revealing the network endpoint's network location to the client 301. In some embodiments, the client 301 may be a network application or an internet user. The client 301 interacts with a server 302. In some embodiments, the network endpoint 305 connects to the server 302 by navigating to a known URL address of the server 302. The server 302 interacts with a platform as a service provider 303. In some embodiments, the server requests the platform as a service provider to create a pool of proxy instances 304 (e.g., a proxy instance that is only configured for connections between the client 301 and the network endpoint 305 or a limited set of network endpoints). In some embodiments, the platform as a service provider 303 is configured with Portal Proxy software and configures the pool of proxy instances 304 as Portal Proxy instances.

The connection between the client 301 and the network endpoint 305 is facilitated by the individual proxy instance 306, which is allocated to the client 301 by the server 302 when a client 301 navigates to a known URL for the network endpoint 305 in some embodiments. Upon allocating the individual proxy instance 306 to the client 301, a new proxy instance is added to the pool of proxy instances 304 to maintain the pool of proxy instances 304 in some embodiments. In some embodiments, the platform as a service provider 303 sends a URL of the individual proxy instance 306 to the server 302, which then sends the URL of the proxy instance 104 to the client 301. The client 301 then accesses the individual proxy instance 306, such as by using the URL of the individual proxy instance 306 to establish a connection to the individual proxy instance 306. This connection between the client 301 and the individual proxy instance 306 may take a variety of forms, including a virtual private network (VPN) connection. In some implementations, the individual proxy instance 306 may be configured with an IP address whitelist that is populated with an address associated with the client 301, thereby limiting connections to the individual proxy instance 306 to connections from the client 301.

In embodiments, this process prevents the client 301 from determining an actual network location of the network endpoint 305. Instead, the client 301 is limiting to determining a network location of the individual proxy instance 306 by observing the connection made to the network endpoint 305 by the client 301 through the individual proxy instance 306. In some examples, the individual proxy instance 306 is a temporary entity to facilitate communication between the client 301 and the network endpoint 305 for a limited period of time. For example, the individual proxy instance 306 may be deleted upon the occurrence of a session end criteria (e.g., session end criteria as described above with reference to FIG. 1. In embodiments, the pool of proxy instances 304 may not use the real IP address of the network endpoint 305 as their designated endpoint, but may instead be Inbound Proxy nodes of a Fognigma Network, as described in U.S. Pat. Nos. 9,935,850, 10,476,761, and 10,897,409. In embodiments, the actual network endpoint 305 server(s) may exist within a Fognigma Network and accessible only via an Inbound Proxy.

Figure 4:
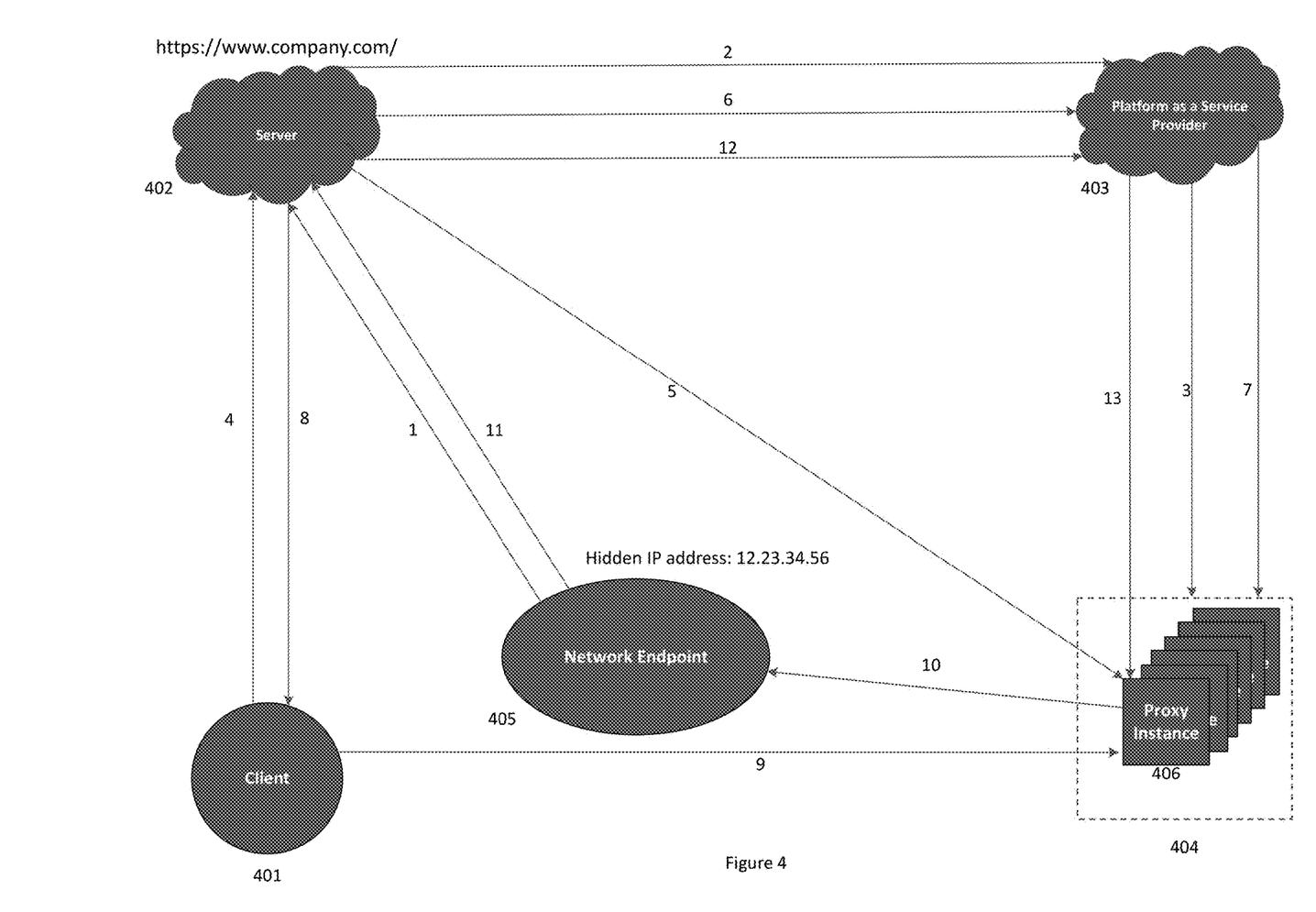
FIG. 4 is a block diagram depicting an example set of operations to establish a network connection between a client and a network endpoint without revealing the network endpoint's network location to the client.

FIG. 4 is a block diagram depicting an example set of operations to establish a network connection between a client 401 and a network endpoint 405 without revealing the network endpoint's network location to the client 401. In some embodiments, in communication 1 of FIG. 4, a network endpoint 405 initiates a connection with a server 402 by connecting to a known URL address of the server 402. In communication 2 of FIG. 4, the server 402 then makes a request to a platform as a service provider 403 to configure and launch a pool of proxy instances 404.

In embodiments, in communication 3 of FIG. 4, the pool of proxy instances 404 are each configured to redirect inbound connections to the network endpoint 405. In embodiments, credentials for configuring the pool of proxy instances 404 are provided by the network endpoint 405. In some embodiments, the pool of proxy instances 404 are Portal Proxy instances.

When a client 401 enters a known URL of the network endpoint 405, the client is connected to the server 402 in communication 4 of FIG. 4. Upon connecting to the server 402, in communication 5 of FIG. 4, the server 402 allocates an individual proxy instance 406 from the pool of proxy instances 404 for use by the client 401. As the server 402 allocates the individual proxy instance 406 from the pool of proxy instances 404 for use by the client 401, in communication 6 of FIG. 4, the server 402 sends a request to the platform as a service provider 403 to configure and launch a new proxy instance to maintain the pool of proxy instances 404. In communication 7 of FIG. 4, the platform as a service provider then configures and launches a new proxy instance to maintain the pool of proxy instances 404.

In embodiments, in communication 8 of FIG. 4, the server 402 issues an HTTP 302 (Resource Temporarily Moved) response code to the client 401, containing a URL of the individual proxy instance 406 that was allocated to the client 401 by the server 402. Upon receiving the URL of the individual proxy instance 406, the client 401 makes a connection to the individual proxy instance 406 in communication 9 of FIG. 4. The individual proxy instance 406 forwards the connection with the client 401 to the network endpoint 405 in communication 10 of FIG. 4.

In embodiments, this process prevents the client 401 from determining an actual network location of the network endpoint 405. Instead, the client 401 is limited to determining a network location of the individual proxy instance 406 by observing the connection made to the network endpoint 405 by the client 401 through the individual proxy instance 406.

In some examples, the individual proxy instance 406 is a temporary entity to facilitate communication between the client 401 and the network endpoint 405 for a limited period of time. For example, the individual proxy instance 406 may be deleted upon the occurrence of a session end criteria. In some embodiments, the session end criteria occurs when the network endpoint 405 determines the session with the client 401 to be over. In some embodiments, the session with the client 401 may be deemed to be over when the client 401 terminates a connection to the network endpoint 405 or to the individual proxy instance 406, whereupon detection of that connection termination, the individual proxy instance 406 initiates termination of its instance. In another example, the session end criteria takes the form of an expiration of a pre-determined period of time, or inactivity for more than a threshold period of time such session end criteria may be detected by the individual proxy instance 406 or by the server 402 that spawned the individual proxy instance 406. In some embodiments, when the network endpoint 405 determines the session with the client 401 to be over the network endpoint 405 directs the server 402 to delete the individual proxy instance 406 via a communication to the server 102 in communication 11 of FIG. 4. In communication 12 of FIG. 4, the server 402 directs the platform as a service provider 403 to delete the individual proxy instance 406. In communication 13 of FIG. 4, the platform as a service provider 403 deletes the proxy instance 406.

Figure 5:
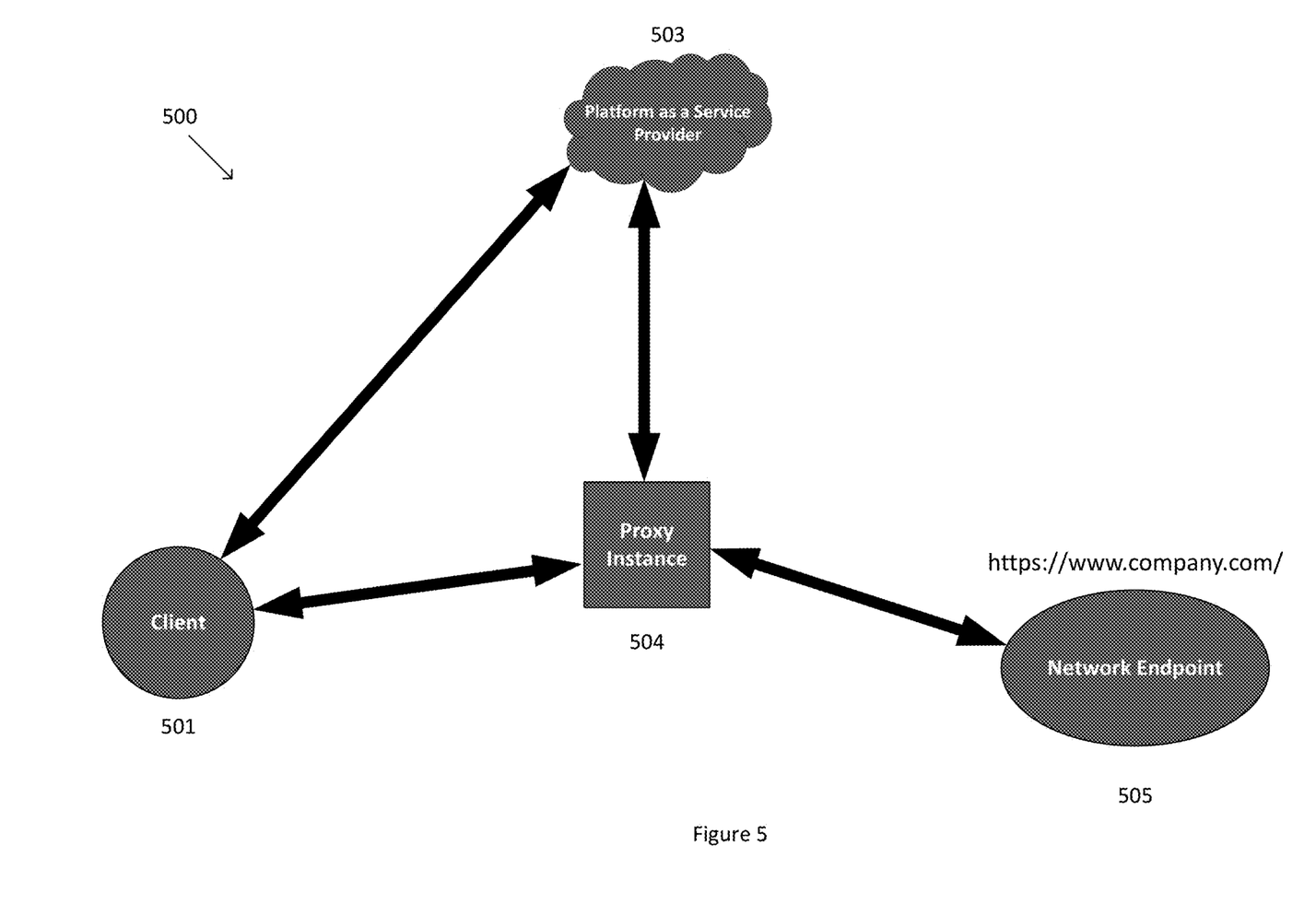
FIG. 5 depicts an example topology configuration of a serverless computer-implemented environment to establish a network connection between a client and a network endpoint without revealing the client's network location to the network endpoint.

FIG. 5 depicts an example topology configuration of a serverless computer-implemented environment 500 to establish a network connection between a client 501 and a network endpoint 505 without revealing the client's network location to the network endpoint 505. In some embodiments, the client 501 may be a network application or a network user. In some embodiments, the client 501 requests a proxy connection to the network endpoint 505 by communicating a known URL address of the network endpoint 505 to a platform as a service provider 503.

Upon receiving the URL of the network endpoint 505 from the client 501, the platform as a service provider 503 configures and launches a proxy instance 504 (e.g., a proxy instance that is only configured for connections between the client 501 and the network endpoint 505 or a limited set of network endpoints). The proxy instance 504 is configured to redirect connections made to the proxy instance 504 to the network endpoint 505. In some embodiments, the proxy instance 504 is an instance of the Portal Proxy software. In some embodiments, the platform as a service provider 503 communicates a URL of the proxy instance 504 to the client 501 upon launching the proxy instance 504.

Upon receiving the URL of the proxy instance 504, the client 501 uses the URL to make a connection to the proxy instance 504. The connection of the client 501 to the proxy instance 504 is then forwarded by the proxy instance 504 to the network endpoint 505. This connection between the client 501 and the proxy instance 504 may take a variety of forms, including a virtual private network (VPN) connection. In some implementations, the proxy instance 504 may be configured with an IP address whitelist that is populated with an address associated with the client 501, thereby limiting connections to the proxy instance 504 to connections from the client 501.

In embodiments, this process prevents the network endpoint 505 from determining an actual network location of the client 501. Instead, the network endpoint is limited to determining a network location of the proxy instance 504 by observing the connection made to the network endpoint 505 by the client 501 through the proxy instance 504.

In some examples, the proxy instance 504 is a temporary entity to facilitate communication between the client 501 and the network endpoint 505 for a limited period of time. For example, the proxy instance 504 may be deleted upon the occurrence of a session end criteria as described above. In embodiments, the implementation of FIG. 5 can be accomplished without the client 501 needing to have accounts or credentials with any platform as a service provider 503. The proxy instance 504 may be configured with an IP address whitelist limiting connections to the proxy instance 504 to connections from the client 501.

Figure 6:
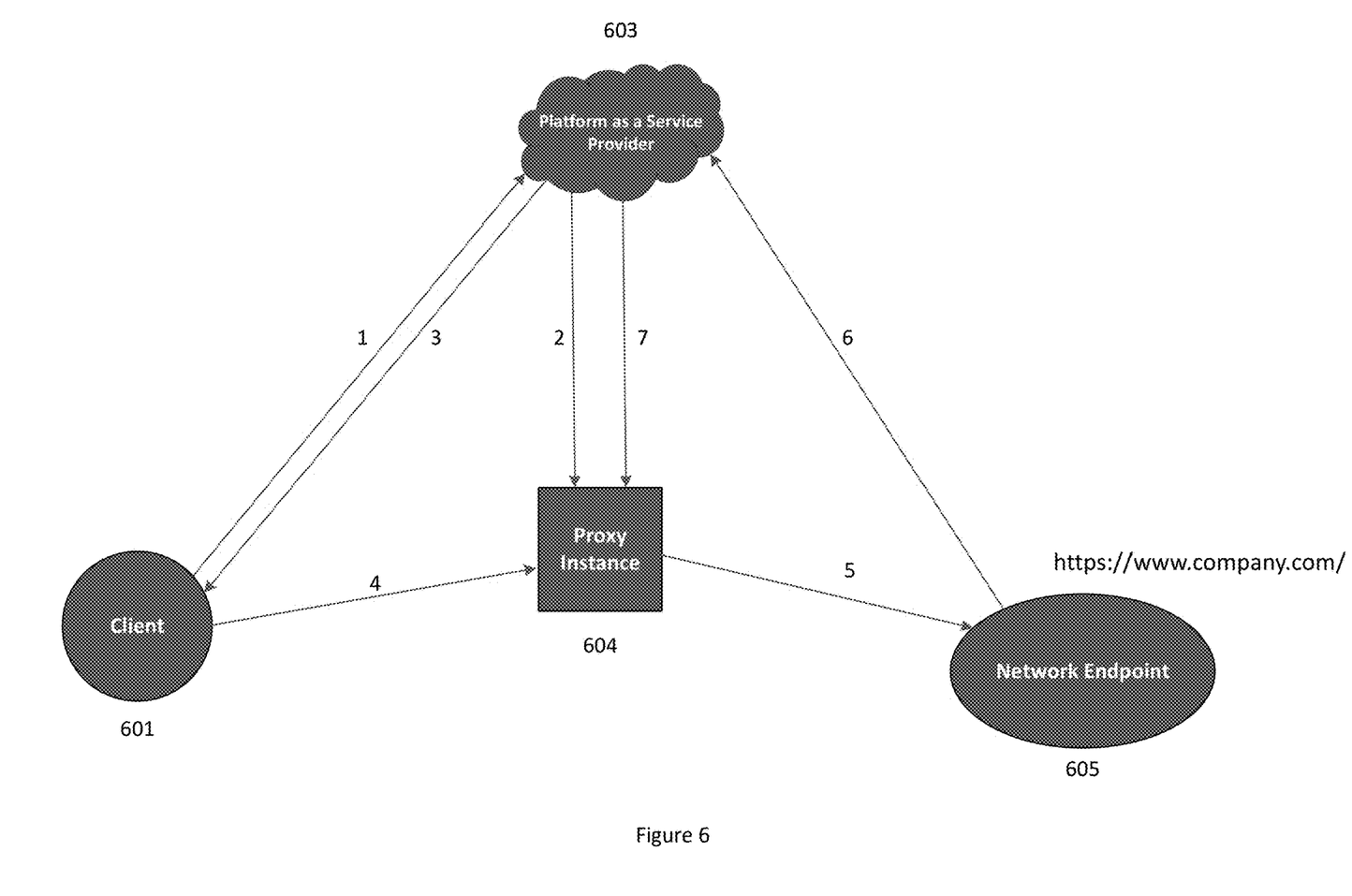
FIG. 6 is a block diagram depicting an example serverless set of operations to establish a network connection between a client and a network endpoint without revealing the client's network location to the network endpoint.

FIG. 6 is a block diagram depicting an example serverless set of operations to establish a network connection between a client 601 and a network endpoint 605 without revealing the client's network location to the network endpoint 605. In some embodiments, the client 601 may be a network application or a network user. In some embodiments, in communication 1 of FIG. 6, the client 601 makes a connection to a platform as a service provider 603 and requests the platform as a service provider 603 to configure and launch a proxy instance 604 (e.g., a proxy instance that is only configured for connections between the client 101 and the network endpoint 105 or a limited set of network endpoints).

In some embodiments, a known URL of the network endpoint 605 is provided to the platform as a service provider 603 by the client 601, which configures the proxy instance 604 to have a proxy destination of the known URL of the network endpoint 605 in communication 2 of FIG. 6. In some embodiments, the proxy instance 604 is a Portal Proxy instance.

In some embodiments, upon launching the proxy instance 604, the platform as a service provider reports successful launch of the proxy instance 604 to the client 601, along with a URL of the proxy instance 604 in communication 3 of FIG. 6. Upon receiving the URL of the proxy instance 604, the client 601 establishes a connection to the proxy instance 604 in communication 4 of FIG. 6. This connection between the client 601 and the proxy instance 604 may take a variety of forms, including a virtual private network (VPN) connection. In some implementations, the proxy instance 604 may be configured with an IP address whitelist that is populated with an address associated with the client 601, thereby limiting connections to the proxy instance 604 to connections from the client 601. The connection between the client 601 and the proxy instance 604 is then forwarded by the proxy instance 604 to the network endpoint 605 in communication 5 of FIG. 6.

The proxy instance 604 is deleted upon the occurrence of a session end criteria. In some embodiments, the session end criteria occurs when the network endpoint 605 determines the session with the client 601 to be over. In some embodiments, the session with the client 601 may be deemed to be over when the client 601 terminates a connection to the network endpoint 605, an expiration of a pre-determined period of time, or inactivity for more than a threshold period of time. In some embodiments, when the network endpoint 605 determines the session with the client 601 to be over, in communication 6 of FIG. 6, the network endpoint 605 directs the platform as a service provider 603 to delete the individual proxy instance 604. In communication 7 of FIG. 6, the platform as a service provider 603 deletes the proxy instance 604.

Under these circumstances, the network endpoint 605 is unable to determine an actual network location of the client 601. Instead, the network endpoint 605 can only determine a network location of the proxy instance 604 by observing the connection made to the network endpoint 605 by the client 601 through the proxy instance 604.

The proxy instance 604 may be configured with an IP address whitelist limiting connections to the proxy instance 604 to connections from the client 601.

Figure 7:
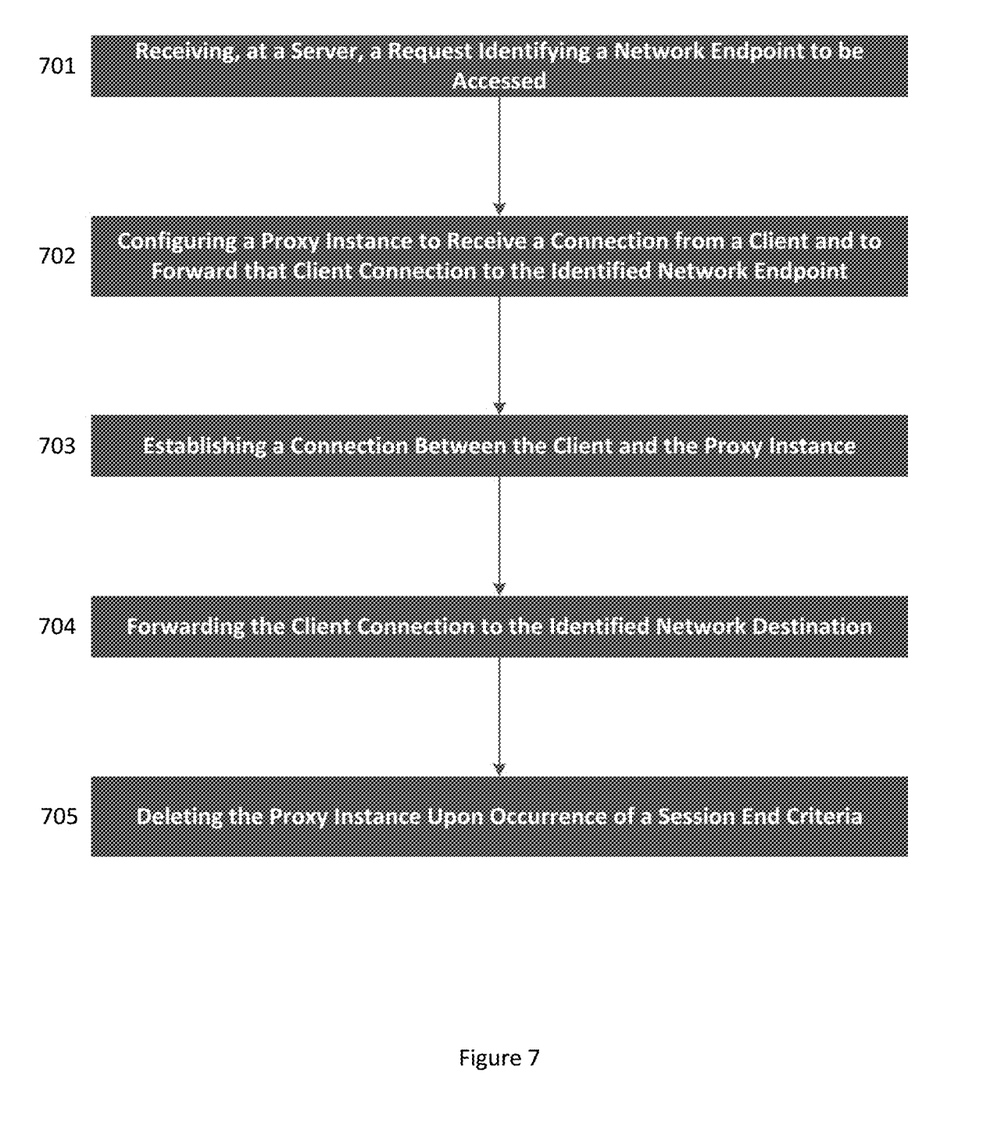
FIG. 7 is a flow diagram depicting a computer-implemented method configuration to establish a network connection between two parties comprising a client and a network endpoint without revealing one party's network location to the other party.

FIG. 7 is a flow diagram depicting a computer-implemented method configuration to establish a network connection between two parties comprising a client and a network endpoint without revealing one party's network location to the other party. At 701, a request is made to a server identifying a network endpoint to be accessed. At 702, a proxy instance is configured to receive a connection from a client and to forward that client connection to the identified network endpoint. At 703, a connection is established between the client and the proxy instance. At 704, the client connection is forwarded to the identified network destination. At 705, the proxy instance is deleted upon occurrence of a session end criteria.

Systems and methods as described herein may take a variety of forms. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method of connecting a client to a desired network endpoint, comprising:
   receiving, at a server, a request identifying a network endpoint to be accessed;
   configuring a proxy instance, the proxy instance being configured to receive a connection from a client and to forward that client connection to the identified network endpoint, wherein the proxy instance is implemented by:
      configuring a first reverse proxy connection and a second reserve proxy connection, each configured to receive a connection from the client to set up a discreet connection; and
      sending access credentials to the client over the first reverse proxy connection including an address for accessing the second reverse proxy connection, wherein the second reverse proxy connection is associated with the proxy instance; and
   deleting the proxy instance upon occurrence of a session end criteria.

2. The method of claim 1, wherein the request identifying a network endpoint to the server is received from the network endpoint.

3. The method of claim 2, wherein the server requests a platform as a service to create a pool of proxy instances.

4. The method of claim 3, wherein the server allocates one proxy instance from the pool of proxy instances to the client upon the client entering a URL corresponding to the network endpoint.

5. The method of claim 4, wherein the server requests the platform as a service to create a new proxy instance upon the server allocating one proxy instance from the pool of proxy instances to the client.

6. The method of claim 4, wherein the server issues an HTTP 302 (Resource Temporarily Moved) response code to the client containing a URL of the proxy instance that was allocated to the client.

7. The method of claim 1, wherein the proxy instance is further implemented by:
   sending an invitation indicating a mechanism for accessing the first reverse proxy connection to the client;
   deleting the first reverse proxy connection upon delivery of the access credentials for the second reverse proxy connection; and
   facilitating the discreet connection between the client and the network endpoint without any detectable direct contact with the network endpoint using the second reverse proxy connection.

8. The method of claim 1, wherein the session end criteria comprises the client terminating a connection to the network endpoint, an expiration of a pre-determined period of time, or inactivity for more than a threshold period of time.

9. The method of claim 1, wherein the request identifying a network endpoint to the server is received from the client.

10. The method of claim 9, wherein the proxy instance is configured with an IP address whitelist limiting connections to the proxy instance to connections from the client.

11. The method of claim 1, wherein the server sends a request to a platform as a service to configure the proxy instance.

12. The method of claim 11, wherein the server requests the platform as a service to delete the proxy instance upon occurrence of session end criteria.

13. The method of claim 11, wherein the server receives a URL to the proxy instance from the platform as a service and transmits the URL to the proxy instance to the client, the client establishing a connection to the proxy instance using the URL to the URL to the proxy instance.

14. The method of claim 13, wherein the desired endpoint is the public IP address of an inbound proxy node comprising a hub device of an on-demand computing network configured to comprise one or more rim devices, which can only be contacted by the client through the hub device wherein the network endpoint is configured to be a rim device.

15. A computer-implemented system for connecting a client to a desired network endpoint, comprising:
   a server comprising:
      one or more data processors; and
      a non-transitory computer-readable medium encoded with instructions to command one or more data processors to:
         receive a request identifying a network endpoint to be accessed;
         make a request to a platform as a service provider to configure a proxy instance, the proxy instance being configured to receive a connection from a client and to forward that client connection to the identified network endpoint, wherein the proxy instance is implemented by:

configuring a first reverse proxy connection and a second reserve proxy connection, each configured to receive a connection from the client to set up a discreet connection; and sending access credentials to the client over the first reverse proxy connection including an address for accessing the second reverse proxy connection, wherein the second reverse proxy connection is associated with the proxy instance; and delete the proxy instance upon occurrence of a session end criteria.

16. The computer-implemented system of claim 15, wherein the request identifying a network endpoint to the server is made by a client.

17. The computer-implemented system of claim 16, wherein the request identifying a network endpoint to the server is made by the network endpoint.

18. The computer-implemented system of claim 17, wherein the server requests a platform as a service to create a pool of proxy instances.

19. The computer-implemented system of claim 18, wherein the server allocates one proxy instance from the pool of proxy instances to the client upon the client entering a URL corresponding to the network endpoint.

20. A computer-implemented system for connecting a client to a desired network endpoint, comprising:

a processor-implemented platform as a service provider receiving a request from a client to configure a proxy instance, wherein the proxy instance is configured to receive a connection from the client and to forward that client connection to an identified network endpoint, and to delete the proxy instance upon occurrence of a session end criteria and, wherein the proxy instance is implemented the provider via instructions stored on a computer-readable medium that command the processor-implemented platform to execute steps comprising:

configuring a first reverse proxy connection and a second reserve proxy connection, each configured to receive a connection from the client to set up a discreet connection; and sending access credentials to the client over the first reverse proxy connection including an address for accessing the second reverse proxy connection, wherein the second reverse proxy connection is associated with the proxy instance.

\* \* \* \* \*